United States Patent
Reed, II et al.

(10) Patent No.: US 9,844,190 B2
(45) Date of Patent: Dec. 19, 2017

(54) ALPHA PLANTER

(71) Applicants: Henry Vernon Reed, II, Hawthorne, CA (US); Nancy Suzanne Hardon, Hutchinson, KS (US)

(72) Inventors: Henry Vernon Reed, II, Hawthorne, CA (US); Nancy Suzanne Hardon, Hutchinson, KS (US)

( * ) Notice: Subject to any disclaimer, the term of this patent is extended or adjusted under 35 U.S.C. 154(b) by 145 days.

(21) Appl. No.: 14/824,651

(22) Filed: Aug. 12, 2015

(65) Prior Publication Data

US 2016/0278305 A1  Sep. 29, 2016

Related U.S. Application Data

(60) Provisional application No. 62/177,743, filed on Mar. 23, 2015.

(51) Int. Cl.
*A01G 13/04* (2006.01)
*A01G 13/02* (2006.01)

(52) U.S. Cl.
CPC .......... *A01G 13/04* (2013.01); *A01G 13/0212* (2013.01)

(58) Field of Classification Search
CPC .............................. A01G 13/0212; A01G 13/04
See application file for complete search history.

(56) References Cited

U.S. PATENT DOCUMENTS

| 2,725,675 A | * | 12/1955 | Odle | A01G 13/04 47/21.1 |
| 2,822,644 A | * | 2/1958 | Berger | A01G 13/0281 47/32 |
| 3,896,586 A | * | 7/1975 | Caldwell | A01G 29/00 47/21.1 |
| 4,222,196 A | * | 9/1980 | Pointon | A01G 13/04 47/21.1 |
| 4,392,326 A | * | 7/1983 | Boria | A01G 13/04 47/29.5 |
| 6,311,427 B1 | * | 11/2001 | McNally | A01G 13/04 47/29.3 |

FOREIGN PATENT DOCUMENTS

GB  2094602 A  *  9/1982  ............. A01G 9/021

* cited by examiner

*Primary Examiner* — Daniel J Colilla
(74) *Attorney, Agent, or Firm* — Los Angeles Patent Group; Arman Katiraei (57) ABSTRACT

In accordance with the present invention, the Alpha Planter provides total protection to new seedlings and small plants purchased for the purpose of growing and maturing for the early development of plants.

6 Claims, 8 Drawing Sheets

Figure 1

Angle Side View

Figure 7

ALPHA PLANTER

FIELD OF INVENTION

This invention relates to gardening and, more particularly, to starting seedlings and small starter plants into a healthy growth cycle.

BACKGROUND OF THE INVENTION

For many years neighborhood farming and home gardening has had a difficult time cultivating new seedlings and growing new small plants. These plants have had to withstand the elements, insects, birds and weeds that would ravage the plants and cause damage to the garden. Millions of gardeners would have to reinvest in new seed or new small freshly store bought plants just to begin all over again. The cost would double for the plants and would sometimes be a waste of time and effort.

Other solutions such as costly protective coverings could be purchased for added protection. Many would use two liter soda bottles and modify them for protection as a quick fix. Protective plastic coverings may have a single-use life, because they would degrade after one season. Modified two liter soda bottles contain a large opening in the neck of the plastic bottle and insects could still crawl inside of the modified plastic bottle and get to the plants.

SUMMARY OF THE INVENTION

In accordance with the present invention, the Alpha Planter provides total protection to new seedlings and growing new small plants. The Alpha Planter is an integrated five (5) stage system that encourages growth and enhances total protection to new seedlings and growing new small purchased plants.

Section 1—Cover Dome provides the ability for natural sunlight to be projected through the clear plastic cover and secures moisture inside the planter.

Section 2—Condensation Mid Chamber secures plant growth and provides moisture and airflow to enrich the plants ability to breathe through the mid-section holes.

Section 3—Flare Chamber provides the internal space for the plant to grow and strengthen. The outside cover of the Flare Chamber is designed to allow water and tap water to run down into the collector bowl base.

Section 4—Collector Bowl Base is used to collect water and provide the appropriate amount of moisture through the drain holes to maintain the soil enrichment in and around the plant/seed.

Section 5—Plastic Spikes secure the Alpha Planter into the soil for strength and stability.

The Alpha Planter is a designed system that can be reused for many years.

BRIEF DESCRIPTION OF THE DRAWINGS

A complete understanding of the present invention may be obtained by referencing the accompanying drawings. When considered in conjunction with the subsequent, detailed description, in which:

FIG. 8 is of the integrated peg system from the side For purposes of clarity and brevity, like elements and components will bear the same designations and numbering throughout the Figures.

DESCRIPTION OF THE PREFERRED EMBODIMENT

Figure 1:
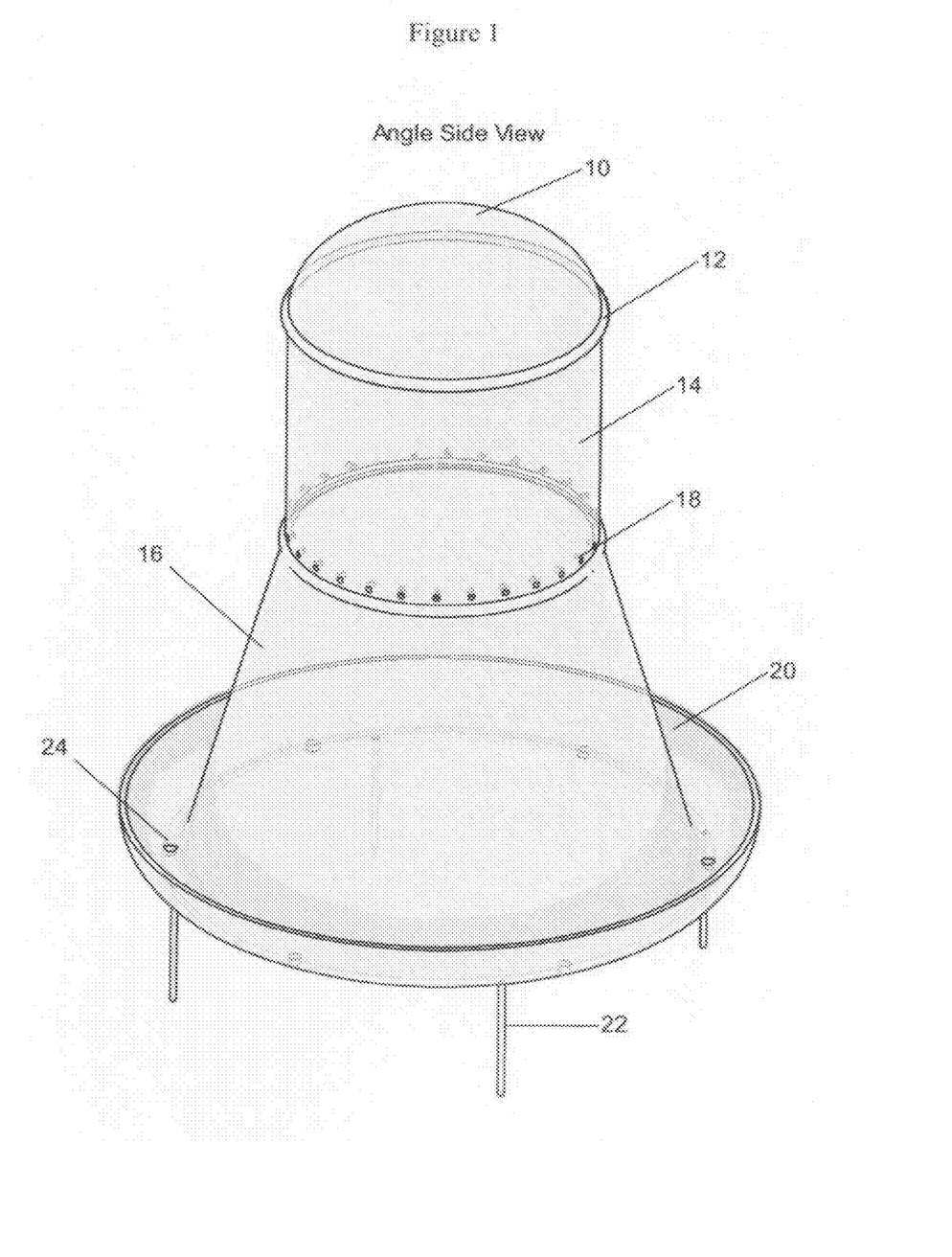
FIG. 1 is a view of an Alpha Planter from the side in the vertical position
Figure 2:
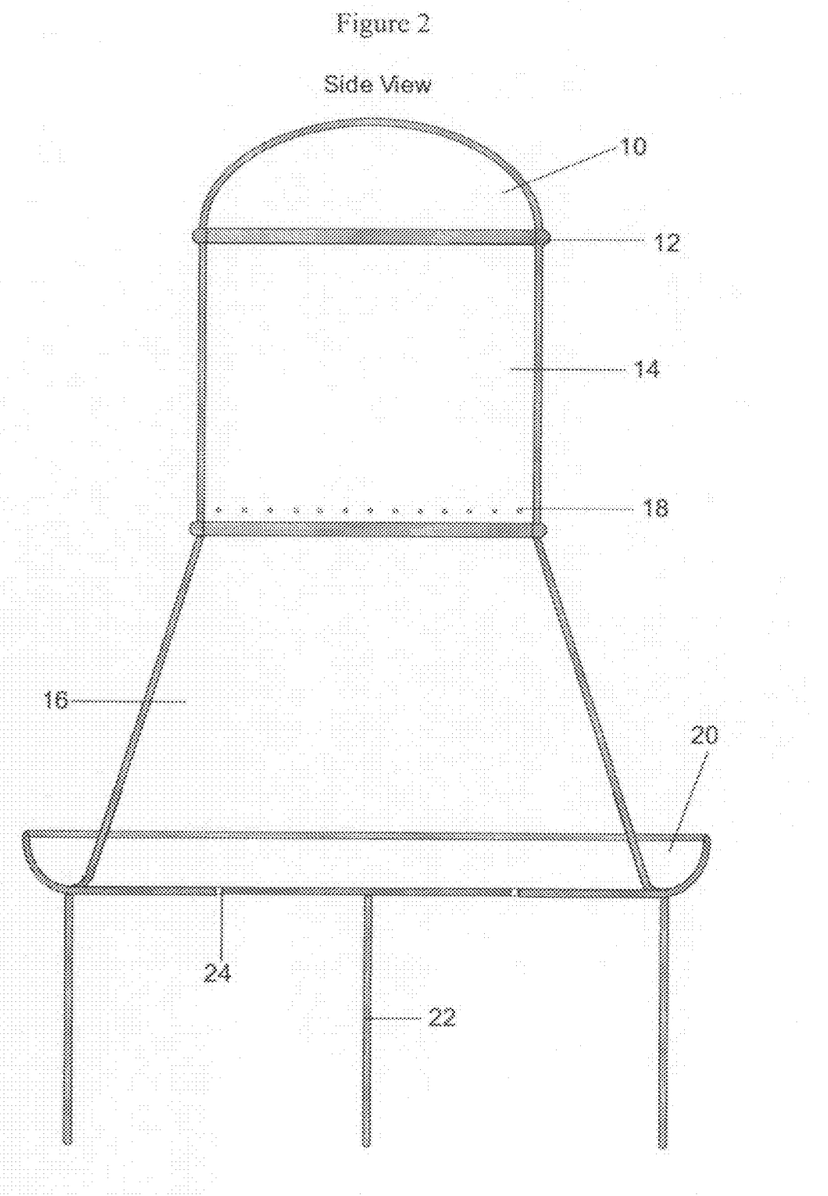
FIG. 2 is a view of an Alpha Planter side view diagram in the vertical position

Referring to the drawings, by reference numbers, FIGS. 1 and 2 are a side view diagram of the Alpha Planter in the vertical position.

FIG. 1 is a view of an Alpha Planter from the side in the vertical position that provides a complete detailed breakdown of all sections of the fully integrated planter. The integrated sections include, Section 1—Cover Dome, Item 10
Section 2—Condensation Mid Chamber, Item 14
Section 3—Flare Chamber, Item 16
Section 4—Collector Bowl Base, Item 20,
Section 5—Mounting Pegs, Item 22.

FIG. 2 is a view of an Alpha Planter side view diagram in the vertical position. Further breakdown of the Alpha Planter, Sections 1 and 2 are molded and attached to a Structural Ring, Item 12 that provide strength and durability. Section 2, Item 18 at the base of the condensation collection chamber has Air Holes, to support climate control and fresh air intake. The Flare Chamber, Section 3, Item 16 Collection Bowl Base, allow internal condensation drainage down through the inside walls of the Flare Chamber. The outer shell of the Flare Chamber, Item 16 bends up at the Collector Bowl Base, Section 4, Item 20 to collect rain or tap water, so it can move through the water drain holes, Item 24 in the collector drain hole to support nutrients into the soil. Section 5 Mounting Pegs, Items 22 secure the unit into the soil for durability, protection and strength.

Figure 3:
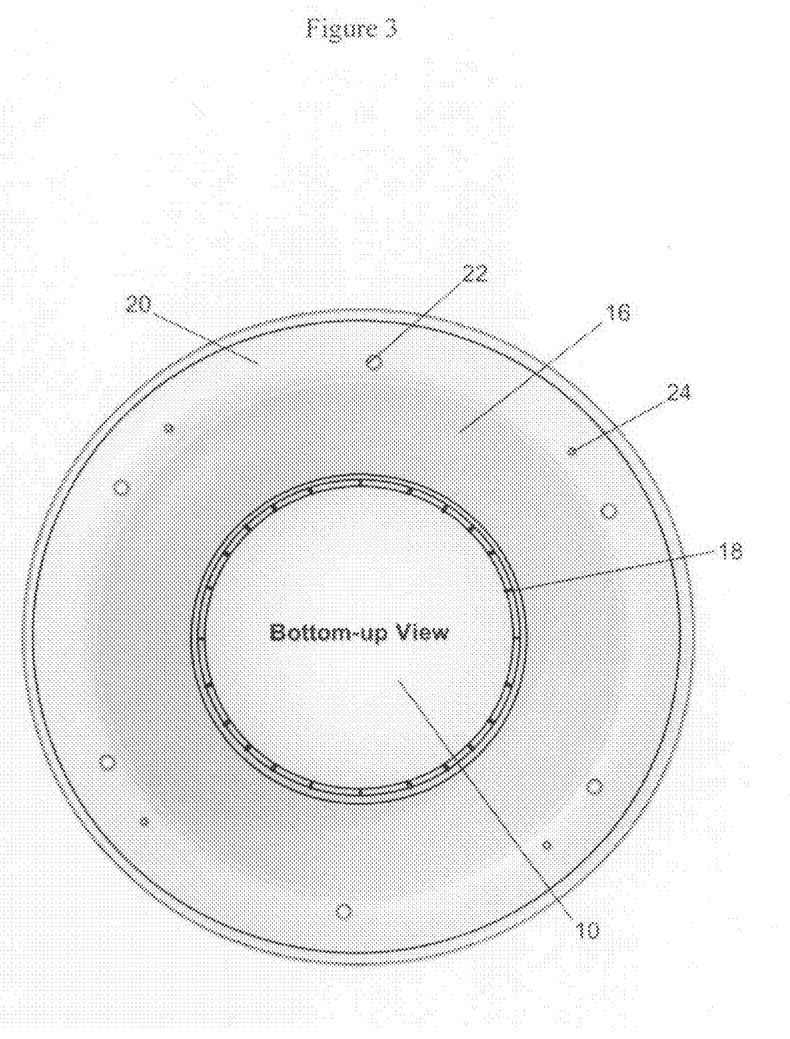
FIG. 3 is a view of an Alpha Planter bottom up diagram in the vertical position

FIG. 3 is a view of an Alpha Planter bottom up diagramed in the vertical position. The bottom up view provides a detailed view of how the Collector Bowl Base Mounting Pegs, Items 22 and 24 water drain holes will be positioned. The Collector Bowl Base transitions to the Flare Chamber to provide a wide girth to the Alpha Planter unit.

Figure 4:
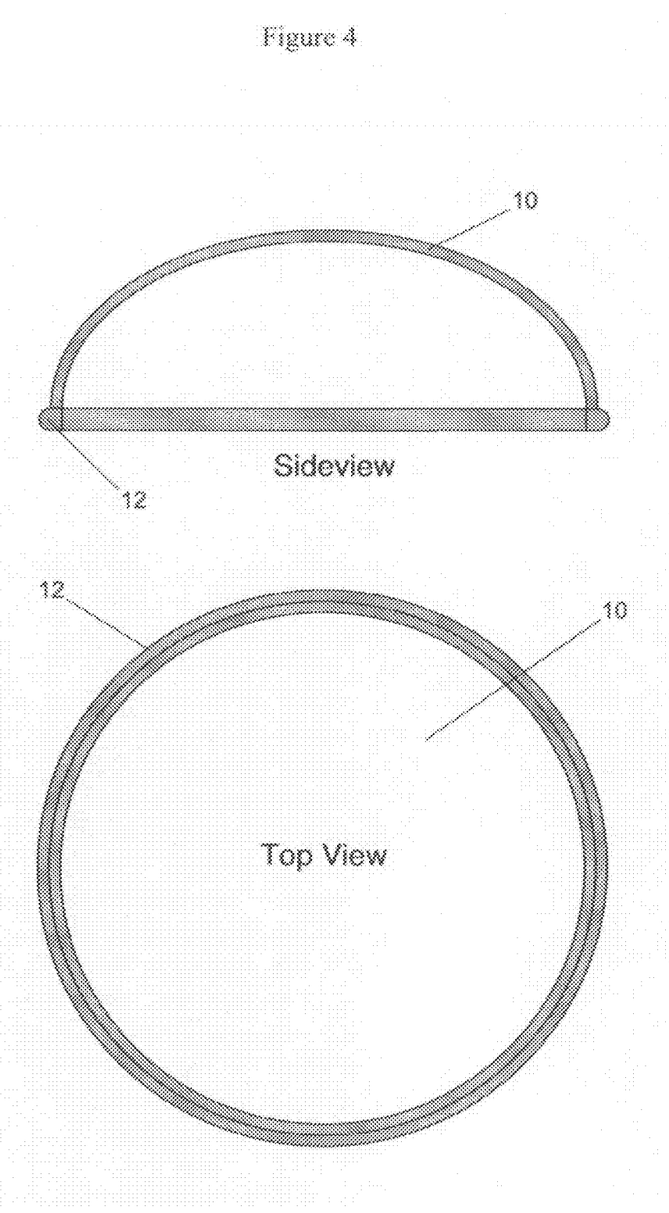
FIG. 4 is a view of an Alpha Planter section 1 of the cover dome from the side and top view

FIG. 4 is a view of an Alpha Planter Section 1 of the Cover Dome from the side and top. Section 1 of the Cover Dome, Item 10 side view and top view, is curved in shape and maintains internal heat and condensation and provides protection to the plant from harsh weather elements, insects, and rodents. It is connected to a Structural Ring, Item 12 that provides better durability to the Cover Dome, Item 10.

Figure 5:
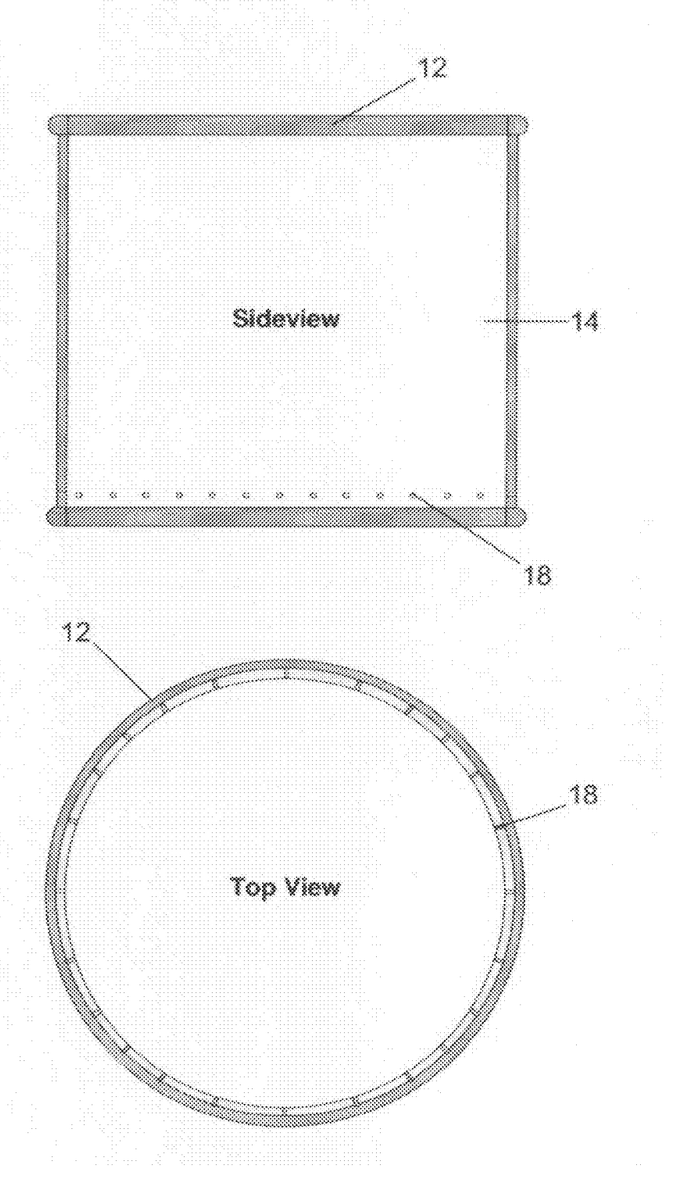
FIG. 5 is a diagram of the section chamber side view and top view

FIG. 5 is a diagram of the section chamber side view and top view. Section 2 of the Condensation Mid Chamber, Item 14 and a series of small Air Holes, Item 18 to take in air flow and provide humidity relief to the plant, Item 14. Connected at the base of the Condensation Mid Chamber, is Structural Ring, Item 12 that provides better efficiency to the Condensation Mid Chamber.

Figure 6:
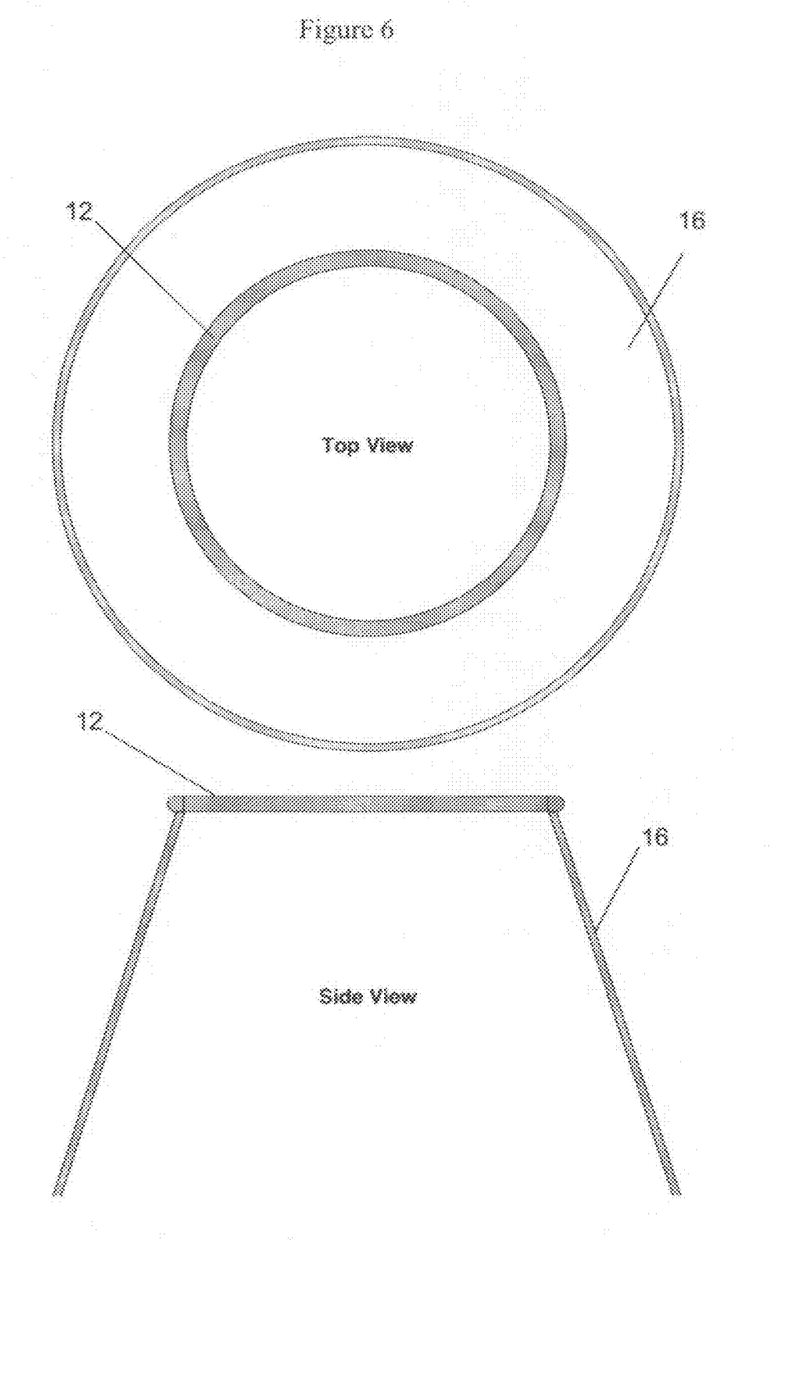
FIG. 6 is the Flare Chamber side and top view

FIG. 6, the Flare Chamber side and top view is a diagram of Section 3 the Flare Chamber, Item 16. It is an upside down wide-based "V" that provides dual functionality. Internally it provides condensation run off to supply nutrients. The external side of the Flare Chamber supports water run off to be collected inside the Collector Bowl Base. The wide base "V" provides the capacity for plant growth and strength.

Figure 7:
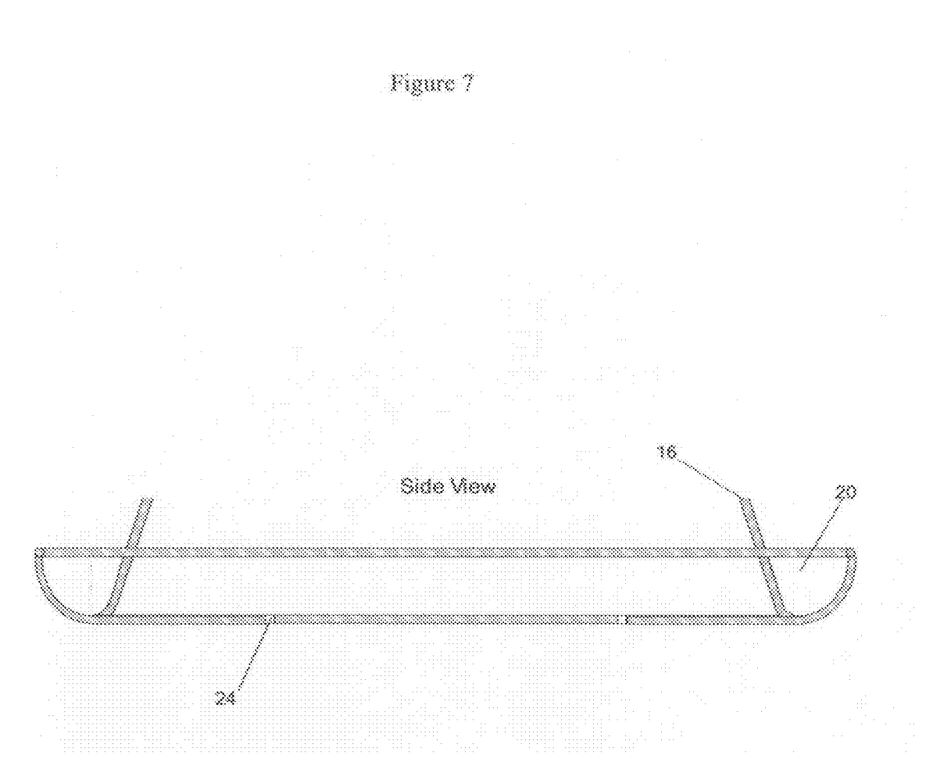
FIG. 7 is a view of the Collector Bowl Base from the side

FIG. 7 is a view of Section 4 the Collector Bowl Base from the side. Section 4, Item 20 is connected at the base of the Flare Chamber, Item 16 and its shape is curled cup to collect rain and tap water to be drained through the holes, Item 24. This provides natural nutrients to the soil, in and around the base of the plant.

Figure 8:
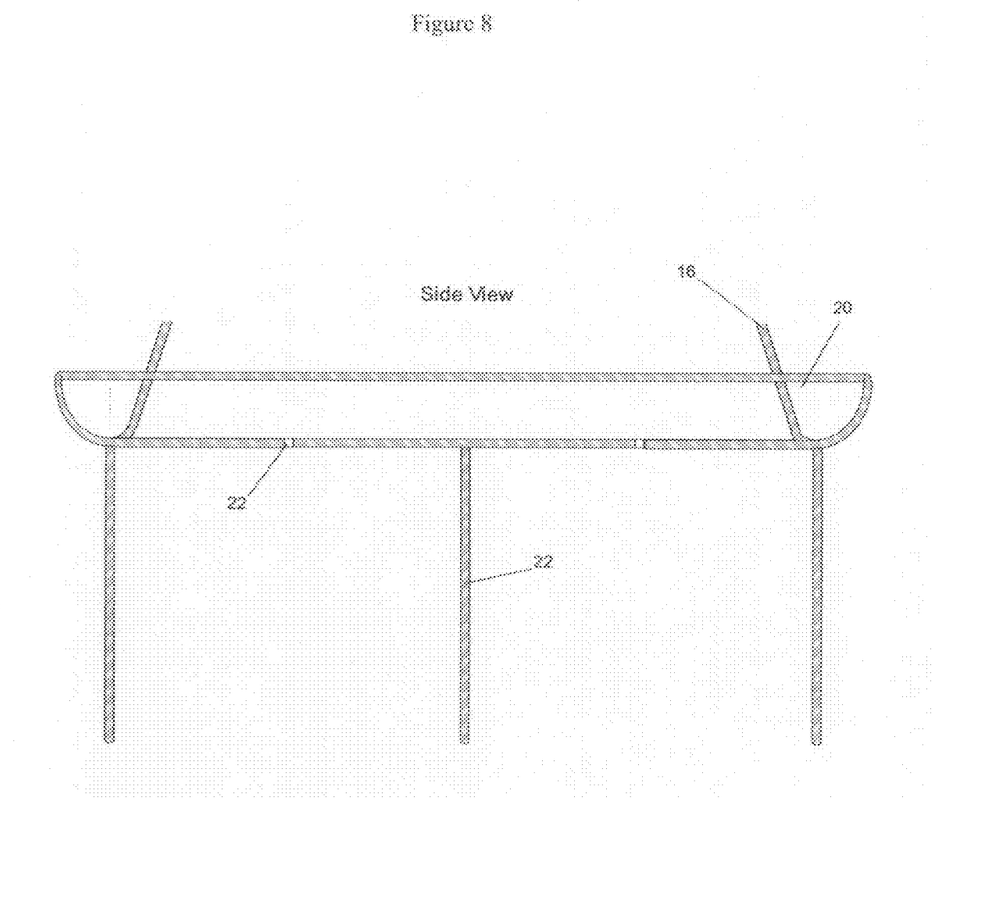

FIG. 8 is Section 5 of the Integrated Peg System from the side. Section 5 is the Mounting Pegs, Item 22 side view, is connected underneath the Collector Bowl Base, Item 20 to attach and secure the Alpha Planter to the soil for usage.

Since other modifications and changes vary to fit particular operating requirements and environments, it will be apparent to those skilled in the art. The invention is not limited to the example chosen for purposes of disclosure, and covers all changes and modifications, which do not constitute departures from the true spirit and scope of this invention.

Having described the invention and what is desired to be protected by Letters of Patent is presented in the subsequently appended claims in the following paragraphs.

What is claimed is:

1. A planter for protection of plant starters and seedlings, the planter comprising:
   a plastic cover dome comprising a semi-spherical, clear, and non-permeable covering;
   a mid chamber comprising a cylindrical hollowed shell extending from a top rim below the plastic cover dome by a distance to a bottom rim, the mid chamber further comprising a plurality of air holes distributed around and over the bottom rim, said plurality of air holes allowing air flow into the planter and condensation to flow outward from inside the planter;
   a structural ring connecting the plastic cover dome to the mid chamber by coupling to a bottom rim of the plastic cover dome and the top rim of the mid chamber;
   a flare chamber rigidly connected to the mid chamber, the flare chamber comprising a conical hollowed shell protruding downwards from the bottom rim of the mid chamber with an increasing diameter; and
   a collector base comprising a circular lip curling upwards and outwards from a bottom end of the flare chamber conical hollowed shell, the collector base further comprising a plurality of drain holes and a plurality of pegs, the plurality of pegs extending from underneath said collector base, the collector base capturing water from an exterior of the flare chamber and redirecting said water through the plurality of drain holes.

2. The planter of claim 1, wherein said collector base is a molded part forming and curling up from the bottom base of the flare chamber.

3. The planter of claim 1, wherein the plastic cover dome comprises a diameter matching to a diameter at the top rim of the mid chamber and the bottom rim of the mid chamber comprises a diameter matching to a diameter at a top end of the flare chamber.

4. A plant protective covering comprising:
   a semi-spherical, clear, and non-permeable dome top, the dome top permitting light inside said plant protective covering while blocking outdoor elements, insects, and animals from entering into the plant protective covering;
   a protective housing coupled to the dome top and extending to ground level, the protective housing further blocking said outdoor elements, insects, and animals from entering into the plant protective covering, the protective housing comprising:
     (i) an upper chamber extending cylindrically downward from the dome top, the upper chamber comprising a plurality of horizontally oriented holes, wherein temperature inside the plant protective covering is regulated with outside air temperature based on airflow through the plurality of horizontally oriented holes; and
     (ii) a lower chamber extending as an inverted "V" from the upper chamber and curving upward a distance from a bottom end of the lower chamber, the lower chamber comprising a plurality of vertically oriented holes about the bottom end of the lower chamber.

5. The plant protective covering of claim 4, wherein said protective housing redirects water contacting an exterior of the plant protective covering to the plurality of vertically oriented holes of the lower chamber, and wherein the plurality of vertically oriented holes permit said water to permeate soil surrounding a plant housed inside the plant protective covering.

6. The plant protective covering of claim 4 further comprising a plurality of spikes extending downward and under the lower chamber, the plurality of spikes affixing a position of the plant protective covering over a plant by penetrating a distance through soil surrounding said plant.

* * * * *